US012783441B2

(12) United States Patent
Seto et al.

(10) Patent No.: US 12,783,441 B2
(45) Date of Patent: Nov. 3, 2026

(54) BUS BAND CONTROL DEVICE AND BUS BAND CONTROL METHOD

(71) Applicant: Mitsubishi Electric Mobility Corporation, Tokyo (JP)

(72) Inventors: Yusuke Seto, Tokyo (JP); Katsuhisa Ogasawara, Tokyo (JP)

(73) Assignee: MITSUBISHI ELECTRIC MOBILITY CORPORATION, Tokyo (JP)

( * ) Notice: Subject to any disclaimer, the term of this patent is extended or adjusted under 35 U.S.C. 154(b) by 0 days.

(21) Appl. No.: 19/121,491

(22) PCT Filed: Oct. 27, 2022

(86) PCT No.: PCT/JP2022/040071

§ 371 (c)(1),
(2) Date: Apr. 16, 2025

(87) PCT Pub. No.: WO2024/089832

PCT Pub. Date: May 2, 2024

(65) Prior Publication Data

US 2026/0133925 A1 May 14, 2026

(51) Int. Cl.
*G06F 13/36* (2006.01)

(52) U.S. Cl.
CPC ...... *G06F 13/36* (2013.01); *G06F 2213/0062* (2013.01)

(58) Field of Classification Search
CPC .................. G06F 13/372; G06F 12/14; G06F 2213/0062; G06F 13/36
See application file for complete search history.

(56) References Cited

U.S. PATENT DOCUMENTS

2002/0004861 A1* 1/2002 Kagemoto .............. G06F 13/30 711/100
2004/0168154 A1* 8/2004 Yoneda ..................... G06F 9/52 717/124

(Continued)

FOREIGN PATENT DOCUMENTS

JP 2006-293536 A 10/2006

OTHER PUBLICATIONS

International Search Report and Written Opinion mailed on Jan. 17, 2023, received for PCT Application PCT/JP2022/040071, filed on Oct. 27, 2022, 8 pages including English Translation.

*Primary Examiner* — Phong H Dang
(74) *Attorney, Agent, or Firm* — XSENSUS LLP

(57) ABSTRACT

Provided are a bus band control device and a bus band control method that prevent loss of availability of resources. A bus band control device includes: a resource division mechanism which is connected to buses and determines ranges of resources accessible by respective programs; a hardware timer which performs an interrupt to a CPU core set at a predetermined timing; a shared memory; and a bus band restriction program which executes occupation processing for the CPU core set when the interrupt is performed, and brings processing of the CPU core set back into a state before the interrupt when the occupation processing is finished. The resource division mechanism permits only the bus band restriction program to access the hardware timer, a vector table, and a storage area that the bus band restriction program uses.

18 Claims, 6 Drawing Sheets

(56) References Cited

U.S. PATENT DOCUMENTS

| | | | | |
|---|---|---|---|---|
| 2012/0042105 | A1* | 2/2012 | Maeda | G06F 13/364 710/110 |
| 2013/0104234 | A1* | 4/2013 | Northup | G06F 21/71 726/30 |
| 2014/0282501 | A1* | 9/2014 | Zeng | G06F 9/5016 718/1 |
| 2020/0125397 | A1* | 4/2020 | Wu | G06F 9/45558 |

* cited by examiner

BUS BAND CONTROL DEVICE AND BUS BAND CONTROL METHOD

CROSS-REFERENCE TO RELATED APPLICATION

This application is a national stage application, pursuant to 35 U.S.C. § 371, of International Patent Application No. PCT/JP2022/040071, filed Oct. 27, 2022, the entire contents of which are incorporated herein by reference.

TECHNICAL FIELD

The present disclosure relates to a bus band control device and a bus band control method.

BACKGROUND ART

A computer configuration includes a bus master which actively starts data transfer, and a bus slave which passively waits for a request from the bus master. A component functioning as a bus master is, for example, a central processing unit (CPU), and components functioning as bus slaves are resources which are hardware materials such as a memory, a storage, and other peripheral devices. The CPU and the resources are connected via buses. The CPU may include a plurality of CPU cores and use resources in a shared manner by a plurality of software programs (hereinafter, simply referred to as programs) which operate on the CPU cores. In a case of using resources in a shared manner by a plurality of programs, usage ranges of the resources are divided on the basis of ranges or units in which influences between the programs should be reduced, in consideration of processing contents, services, and security in a system. In addition, there is a method in which usage ranges of resources are divided for each CPU core on which each software operates. In such a method, it is necessary to consider usage ranges of resources in designing and implementation of programs that operate on the respective CPU cores, so as not to hinder operations of other CPU cores.

Programs that operate on CPU cores include a communication program serving for connection to the outside of the system. Such a communication program allows access from the outside, to maintain connection to the outside of the system. Therefore, using an unknown security hole, the CPU core on which the communication program operates might be hacked. The hacked CPU core can execute unintentional processing, but it is difficult to perfectly deal with such an unknown security hole. Therefore, in a case where a certain CPU core is hacked, it is necessary to prevent the influence of hacking from propagating to other CPU cores.

In order to protect other CPU cores from the influence of hacking, access to resources shared by a plurality of CPU cores needs to be restricted or controlled. For example, Patent Document 1 discloses a bus system in which a bus access control unit provided to a bus bridge circuit which relays data transfer between an internal bus and a peripheral bus allows access to a shared memory only in a case of satisfying a condition that, for example, key data for obtaining access permission and unique data that a CPU has coincide with each other.

CITATION LIST

Patent Document

Patent Document 1: Japanese Laid-Open Patent Publication No. 2006-293536

SUMMARY OF THE INVENTION

Problem to be Solved by the Invention

However, the technology in Patent Document 1 has a problem that, in a case where a certain CPU core is hacked, there is a possibility that availability of resources by other CPU cores is lost. Firstly, in the technology in Patent Document 1, connection to resources other than the shared memory is not via the bus access control unit, and access to resources other than the shared memory is not controlled. In addition, even in a case of using a configuration in which connection to resources other than the shared memory is also made via the bus access control unit, in the method described in Patent Document 1, there is a possibility that the hacked CPU core satisfies a condition for access permission. This is because unique data that the CPU has does not change by hacking of the CPU core and bus access cannot be shut off in response to hacking. In a case where permission of access to a specific resource is given to the hacked CPU core, access from the hacked CPU core to the resource frequently occurs, so that a bus band of a bus connecting the CPU core and the resource is squeezed and thus other CPU cores might be hindered from accessing the resource. When access to the resource is hindered as described above, availability of the resource is lost.

The present disclosure has been made to solve the above problem, and an object of the present disclosure is to provide a bus band control device and a bus band control method that prevent loss of availability of a resource.

Means to Solve the Problem

A bus band control device according to the present disclosure is a bus band control device which, in a system in which a CPU core set which executes a plurality of programs, and a plurality of resources, are connected via a bus, controls a band of the bus used by the programs, the bus band control device including: a resource division mechanism which is connected to the bus and determines ranges of the resources that are accessible by the respective programs; a hardware timer which performs an interrupt to the CPU core set at a predetermined timing; a shared memory which is one of the resources and has storage areas respectively allocated to the plurality of programs by the resource division mechanism; and a bus band restriction program which is executed by the CPU core set and which, when the interrupt is performed, causes execution of occupation processing for the CPU core set, and when the occupation processing is finished, brings processing of the CPU core set back into a state before the interrupt. The storage areas include a vector table indicating processing to be executed when the interrupt is performed, and a storage area that the bus band restriction program uses. The resource division mechanism permits only the bus band restriction program to access the hardware timer, the vector table, and the storage area that the bus band restriction program uses.

A bus band control method according to the present disclosure is a bus band control method for, in a system in which a CPU core set which executes a plurality of programs, and a plurality of resources, are connected via a bus, controlling a band of the bus used by the programs, the bus band control method including the steps of: performing an interrupt to the CPU core set by a hardware timer at a predetermined timing; executing occupation processing for the CPU core set when the interrupt is performed; and bringing processing of the CPU core set back into a state before the interrupt when the occupation processing is finished. Storage areas of a shared memory which is one of the resources include a vector table indicating processing to be executed when the interrupt is performed, and a storage area that a bus band restriction program for executing the occupation processing uses. Only the bus band restriction program is permitted to access the hardware timer, the vector table, and the storage area that the bus band restriction program uses.

Effect of the Invention

The bus band control device and the bus band control method according to the present disclosure can prevent loss of availability of a resource.

DESCRIPTION OF EMBODIMENTS

Embodiment 1

Figure 1:
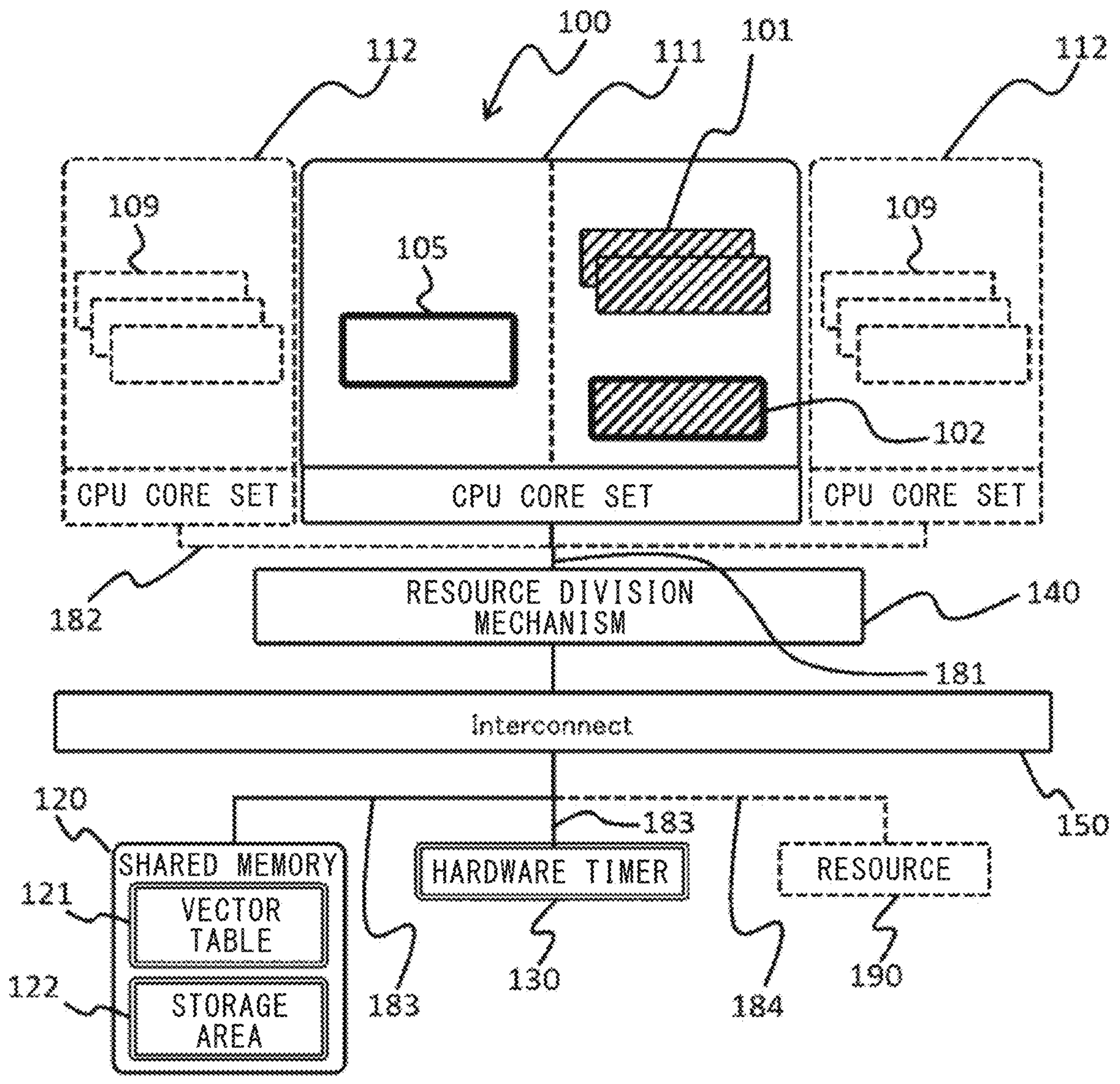
FIG. 1 is a schematic configuration diagram showing a bus band control device according to embodiment 1.

Embodiment 1 will be described with reference to FIG. 1 and FIG. 2. FIG. 1 is a schematic configuration diagram showing a bus band control device according to embodiment 1. In a system including a CPU core set 111 and CPU core sets 112 which execute a plurality of programs 101, 109 and are connected to a plurality of resources via a resource division mechanism 140 and an interconnect 150 (Interconnect in FIG. 1), a bus band control device 100 controls a band (bus band) of a bus used by the program 101 executed in the CPU core set 111. The "resources" in embodiment 1 include a shared memory 120, a hardware timer 130, and a non-control-target resource 190.

The programs 101 executed in the CPU core set 111 include a communication program 102 for performing communication with the outside of the system, and a bus band restriction program 105. On the other hand, the programs 109 executed in the CPU core sets 112 do not include such communication programs 102 and bus band restriction programs 105.

The shared memory 120 is shared by the programs 101 executed in the CPU core set 111 and the programs 109 executed in the CPU core set 112, and storage areas (accessible areas) used by the programs 101 are allocated by the resource division mechanism 140. In FIG. 1, only storage areas allocated to the bus band restriction program 105 are shown. Among storage areas of the shared memory 120, the storage areas allocated to the bus band restriction program 105 are a storage area in which a vector table 121 is stored and a storage area 122 used by the bus band restriction program 105. In the vector table 121, an address indicating processing to be executed by the CPU core set 111 when the hardware timer 130 performs an interrupt to the CPU core set 111 is registered, and in embodiment 1, an address of the bus band restriction program 105 is registered.

The hardware timer 130 performs an interrupt to the CPU core set 111 at a predetermined timing. By this interrupt, the bus band restriction program 105 starts to operate, and occupation processing by the bus band restriction program 105 is executed. The details of the bus band restriction program 105 will be described later.

The resource division mechanism 140 determines ranges of resources that can be accessed by the respective programs 101, and is formed by an input/output memory management unit (IOMMU), for example. The resource division mechanism 140 may be formed using a hardware module that has a register for storing setting information and permits or prohibits access to a bus when the bus master (CPU core set) accesses a bus slave (e.g., shared memory) in accordance with the setting information.

The resource division mechanism 140 in embodiment 1 is configured such that, among the programs 101 executed by the CPU core set 111, only a program having a predetermined key ID is allowed to access components indicated by double lines in FIG. 1, i.e., the vector table 121, the storage area 122, and the hardware timer 130. In embodiment 1, only the bus band restriction program 105 has the above "predetermined key ID". Therefore, only the bus band restriction program 105 is allowed to access the vector table 121, the storage area 122, and the hardware timer 130. However, a target of access control by the resource division mechanism 140 is the programs 101 (hatched in FIG. 1) executed in the CPU core set 111, and therefore access to the hardware timer 130 and the like (components indicated by double lines) by the programs 109 executed in the CPU core sets 112 is not restricted.

The CPU core set 111 and the resource division mechanism 140 are connected via a control target system bus 181. The CPU core sets 112 and the resource division mechanism 140 are connected via a non-control-target system bus 182.

The resource division mechanism 140 is connected to the resources via the interconnect 150 (Interconnect in FIG. 1). The resource division mechanism 140, and each of the shared memory 120 and the hardware timer 130, are connected via a control target external bus 183. The resource division mechanism 140 and the non-control-target resource 190 are connected via a non-control-target external bus 184.

In FIG. 1, there are components indicated by solid lines and components indicated by broken lines. The components indicated by solid lines are targets of access control by the bus band control device 100, and components indicated by broken lines are not targets of access control by the bus band control device 100. That is, the programs 101 (including the communication program 102 and the bus band restriction program 105) executed in the CPU core set 111, the shared memory 120, the hardware timer 130, the resource division mechanism 140, the control target system bus 181, and the control target external bus 183 are control targets. On the other hand, the programs 109 executed in the CPU core sets 112, the non-control-target resource 190, the non-control-target system bus 182, and the non-control-target external bus 184 are not control targets.

Figure 2:
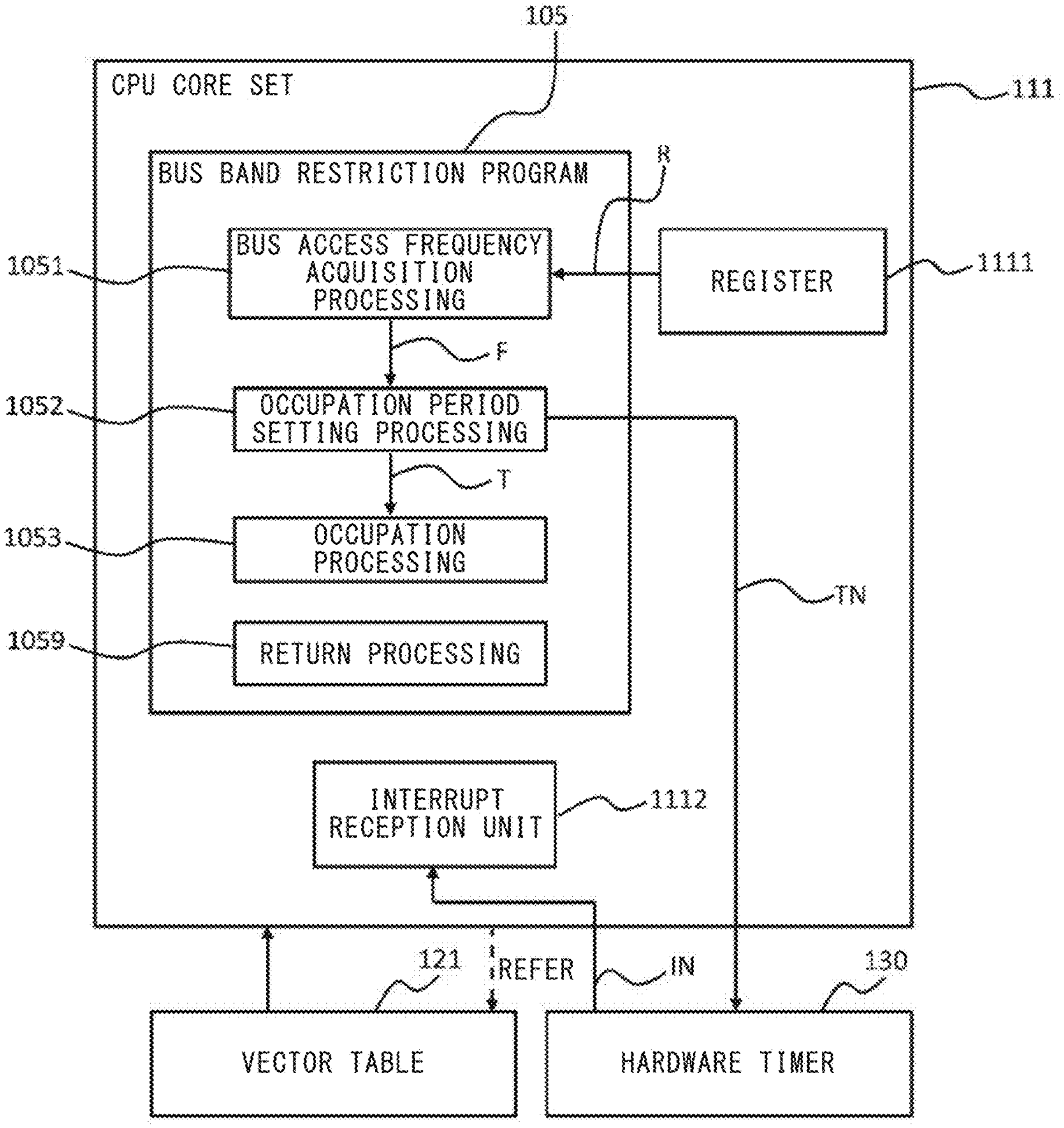
FIG. 2 is a block diagram showing a bus band restriction program according to embodiment 1.

FIG. 2 is a block diagram showing the bus band restriction program according to embodiment 1. The bus band restriction program 105 starts to operate with an interrupt from the hardware timer 130 as a trigger. The hardware timer 130 performs an interrupt by transmitting an interrupt notice IN. The interrupt notice IN is received by an interrupt reception unit 1112 provided in the CPU core set 111. The CPU core set 111 having received the interrupt notice IN refers to the vector table 121, to start processing by the bus band restriction program 105. Processing executed by the bus band restriction program 105 includes bus access frequency acquisition processing 1051 of acquiring a bus access frequency F of access to control target buses (control target system bus 181 and control target external bus 183), occupation period setting processing 1052 of setting an occupation period I which is a period for executing the occupation processing on the basis of the bus access frequency F, occupation processing 1053 of occupying a processing period in the CPU core set 111 during the occupation period T, and return processing 1059.

The bus access frequency acquisition processing 1051 is, for example, processing of reading a register content R stored in a register 1111 of the CPU core set 111 and acquiring the bus access frequency F of access to the control target buses, from the register content R, on the basis of the number of times of counting of instructions relevant to bus access, such as LD/ST instructions (load/store instructions) to the control target buses, during a period from the previous interrupt to the present interrupt. The acquired bus access frequency F is used also at the next interrupt and therefore is retained until the next interrupt.

The occupation period setting processing 1052 includes processing of setting the occupation period I in proportion to the bus access frequency F, for example. The occupation period setting processing 1052 may include processing of setting a specific occupation period T on the basis of whether the bus access frequency F is smaller than a predetermined threshold or is not smaller than the threshold. The occupation period setting processing 1052 may be a combination of processing of setting the bus access frequency F in proportion to the occupation period T as described above and processing of determining the occupation period T by the threshold.

The occupation period setting processing 1052 may include processing of setting a next interrupt time IN and adjusting a frequency at which an interrupt and the occupation processing are performed. In a case of setting the next interrupt time IN by the occupation period setting processing 1052, the next interrupt time IN is transmitted to the hardware timer 130, as shown in FIG. 2.

After the occupation processing 1053 is finished, the bus band restriction program 105 causes execution of the return processing 1059, to bring processing of the CPU core set 111 back into a state before the interrupt.

Specific examples of the occupation processing 1053 include processing that allows setting of a processing period, such as sleep processing, and a combination of processings whose processing periods are measurable in advance. The occupation processing 1053 is not particularly limited, and may be any processing that prevents execution of processing of the programs 101 other than the bus band restriction program 105 by occupying a processing period in the CPU core set 111. By preventing execution of processing of the programs 101 other than the bus band restriction program 105, the bus bands of control target buses are prevented from being used for the programs 101 other than the bus band restriction program 105. That is, during the occupation period T in which the occupation processing 1053 is executed, usage of bus bands of control target buses is restricted.

The bus access frequency F may be acquired from, instead of the number of times of counting of LD/ST instructions as described above, the proportion of the number of times of counting of LD/ST instructions (load/store instructions) among a certain number of instructions around the program counter address just before the interrupt, i.e. the proportion of load instructions and store instructions among a certain number of instructions centered at the program counter address when the interrupt is performed.

Regarding the occupation processing 1053, it suffices that how much the occupation processing 1053 is executed in a certain period can be adjusted. Therefore, by the occupation period setting processing 1052, both of the occupation period T and the next interrupt time IN may be set or one of them may be set. That is, a period of the occupation processing 1053 at one interrupt may be adjusted by setting of the occupation period I, or while a period of the occupation processing 1053 at one interrupt is fixed, the next interrupt time IN may be set, thereby adjusting the frequency at which an interrupt and the occupation processing 1053 are performed.

In order to prevent the occupation processing 1053 by the bus band restriction program 105 from influencing other components such as the CPU core sets 112, after the occupation period T is set as described above, the occupation period T may be corrected in accordance with the status of the entire system, e.g., the operation statuses (a start processing state, a steady operation state, an abnormal processing state, a finish processing state, or a stopped state) of components composing the system. A configuration for determining whether or not to permit execution of the occupation processing 1053 may be adopted. For example, a configuration in which the occupation processing 1053 is not performed if a specific component is being started or under finish processing, may be adopted. As a method for determining the status of the entire system, for example, an operation status such as CPU usage by the programs 101 operating in the CPU core set 111, or a usage status of resources by the programs 101 operating in the CPU core set 111, may be acquired. The occupation period T or the next interrupt time IN may be randomly set so that it becomes difficult to predict a timing or a period of execution of the occupation processing 1053.

Figure 3:
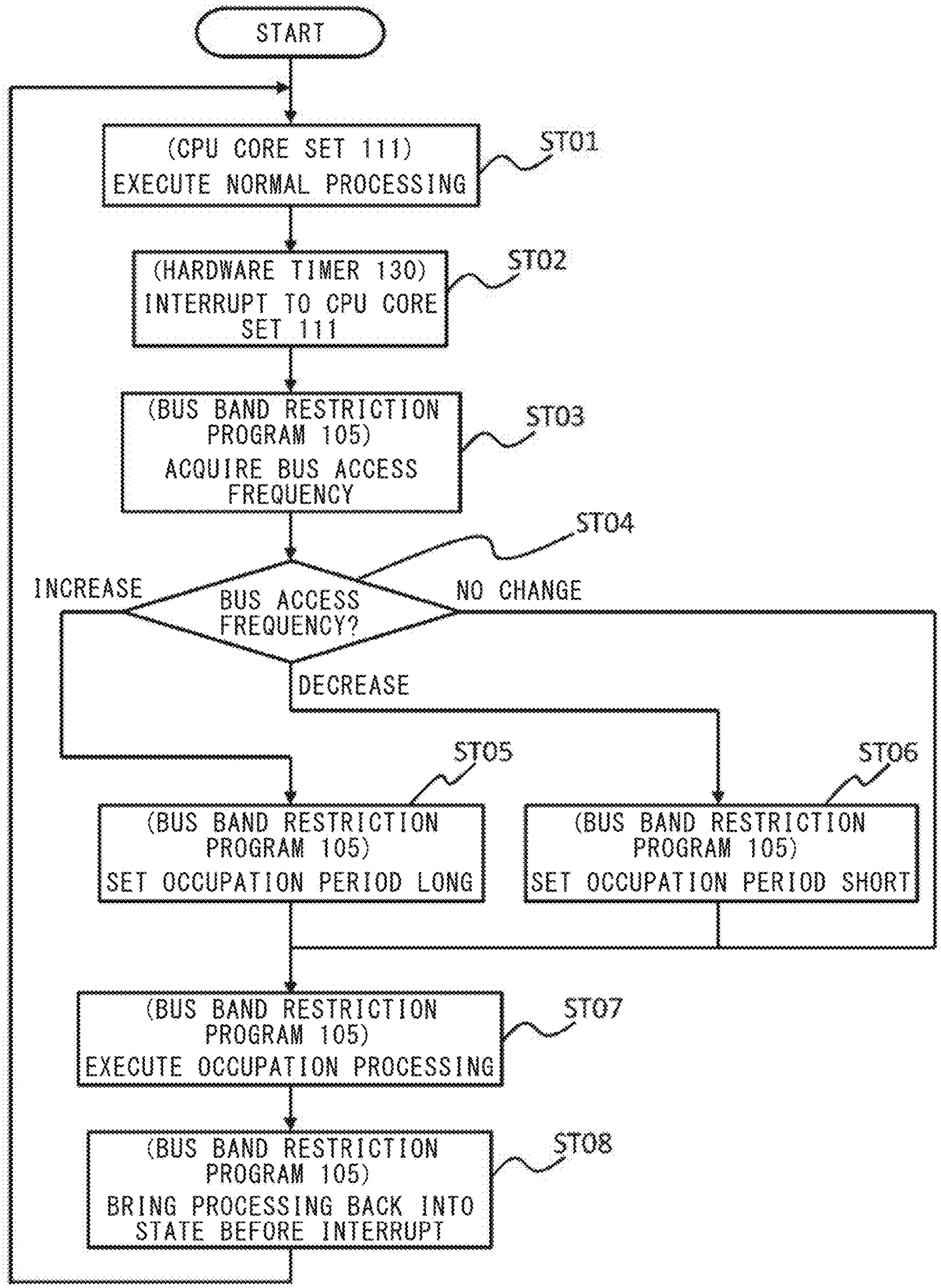
FIG. 3 is a flowchart showing operation of the bus band control device according to embodiment 1.

Next, operation will be described. FIG. 3 is a flowchart showing operation, i.e., a bus band control method, of the bus band control device according to embodiment 1. First, before an interrupt by the hardware timer 130, the CPU core set 111 is executing normal processing (step ST01).

While the CPU core set 111 is executing normal processing, the hardware timer 130 performs an interrupt to the CPU core set 111 at a predetermined timing (if the next interrupt time IN is set, at the interrupt time IN) (step ST02). Thus, the bus band restriction program 105 starts to operate. As described above, by the resource division mechanism 140, only the bus band restriction program 105 is allowed to access the vector table 121, the storage area 122, and the hardware timer 130, and the other programs 101 (programs other than the bus band restriction program 105) of the CPU core set 111 cannot physically access them and therefore cannot engage with the following processing.

Next, the bus access frequency F is acquired by the bus band restriction program 105 (step ST03).

Next, the occupation period T is set. In embodiment 1, as shown in FIG. 3, the bus access frequency F acquired at the previous interrupt and the bus access frequency F acquired this time are compared with each other (step ST04), and if the bus access frequency F has become greater than the previous one, the occupation period T is set to be longer than the previous one (step ST05). On the other hand, if the bus access frequency has become smaller than the previous one, the occupation period T is set to be shorter than the previous one (step ST06). If the bus access frequency F has not changed from the previous one, the occupation period T at the previous interrupt is used, and therefore the processings in step ST05 and step ST06 are not performed.

In the processing in step ST04, for setting the occupation period T, the bus access frequency F acquired at the previous interrupt is used as a threshold. However, as the threshold, a threshold set in advance may be used.

After the occupation period T is set, occupation processing is executed during the occupation period T by the bus band restriction program 105 (step ST07).

When the occupation processing is finished, return processing of bringing the processing of the CPU core set 111 back into a state before the interrupt is executed by the bus band restriction program 105 (step ST08).

There may be a plurality of CPU core sets that execute the bus band restriction program 105, In this case, the operation shown in FIG. 3 is performed in each of the CPU core sets. The CPU core set that executes the bus band restriction program 105 is not particularly limited, but since a program as a cause that brings about hacking is the communication program 102, normally, the bus band restriction program 105 is also executed in the CPU core set in which the communication program 102 is executed.

According to embodiment 1, loss of availability of resources can be prevented. More specifically, in a system in which a CPU core set which executes a plurality of programs, and a plurality of resources, are connected via a bus, the bus band control device includes: a resource division mechanism which is connected to the bus and determines ranges of the resources that are accessible by the respective programs; a hardware timer which performs an interrupt to the CPU core set at a predetermined timing; a shared memory which is one of the resources and has storage areas respectively allocated to the plurality of programs by the resource division mechanism; and a bus band restriction program which is executed by the CPU core set and which, when the interrupt is performed, causes execution of occupation processing for the CPU core set, and when the occupation processing is finished, brings processing of the CPU core set back into a state before the interrupt. The storage areas of the shared memory include a vector table indicating processing to be executed when the interrupt is performed, and a storage area that the bus band restriction program uses. The resource division mechanism permits only the bus band restriction program to access the hardware timer, the vector table, and the storage area that the bus band restriction program uses. Thus, programs other than the bus band restriction program cannot access the hardware timer, the vector table, and the storage area that the bus band restriction program uses, and therefore programs other than the bus band restriction program cannot engage with operation from notification of an interrupt by the hardware timer to execution of the occupation processing by the bus band restriction program. Therefore, even if the CPU core set is hacked and there is a possibility that other programs perform unintentional processing, the occupation processing by the bus band restriction program is assuredly performed so as to occupy a processing period in the CPU core set. As a result, usage of the bus band by the hacked CPU core set is restricted and bus bands for other CPU core sets to use resources are ensured, whereby loss of availability of resources is prevented.

Embodiment 2

Figure 4:
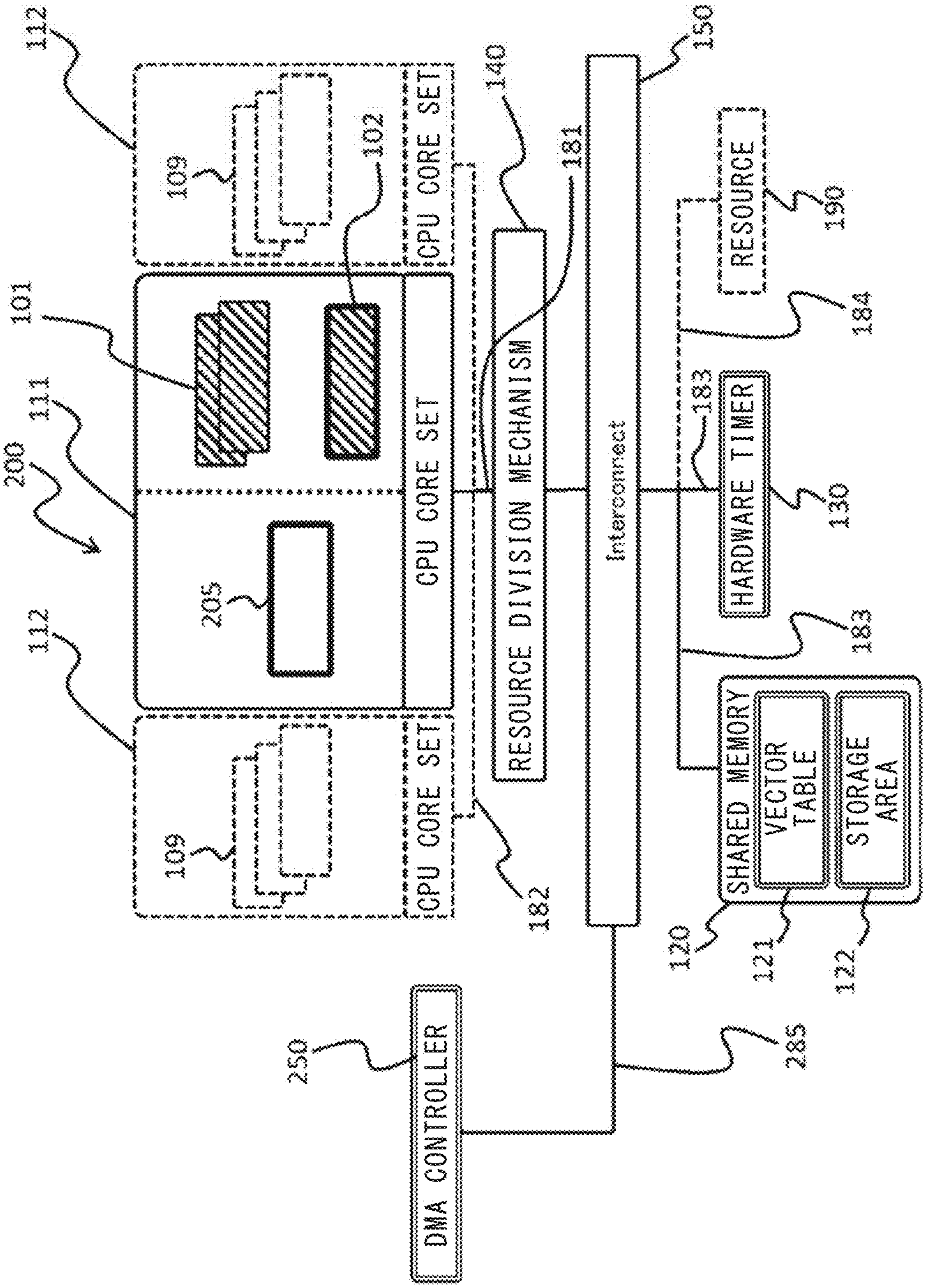
FIG. 4 is a schematic configuration diagram showing a bus band control device according to embodiment 2.

Next, embodiment 2 will be described with reference to FIG. 4 to FIG. 6. Components that are the same as or correspond to those shown in FIG. 1 to FIG. 3 are denoted by the same reference characters, and the description thereof is omitted. In embodiment 2, a case where the shared memory may be accessed via another bus slave, as in a case where there is a DMA (direct memory access) controller, for example, is shown. FIG. 4 is a schematic configuration diagram showing a bus band control device according to embodiment 2. A bus band control device 200 basically has the same configuration as the bus band control device 100 shown in embodiment 1, but the system includes a DMA controller 250, and the CPU core set 111 and the CPU core sets 112 may issue instructions to the shared memory 120 via the DMA controller 250. Therefore, the configuration of a bus band restriction program 205 is different from that of the bus band restriction program 105, as described later. The DMA controller 250 is connected to the resource division mechanism 140 via a dynamic control target external bus 285.

Figure 5:
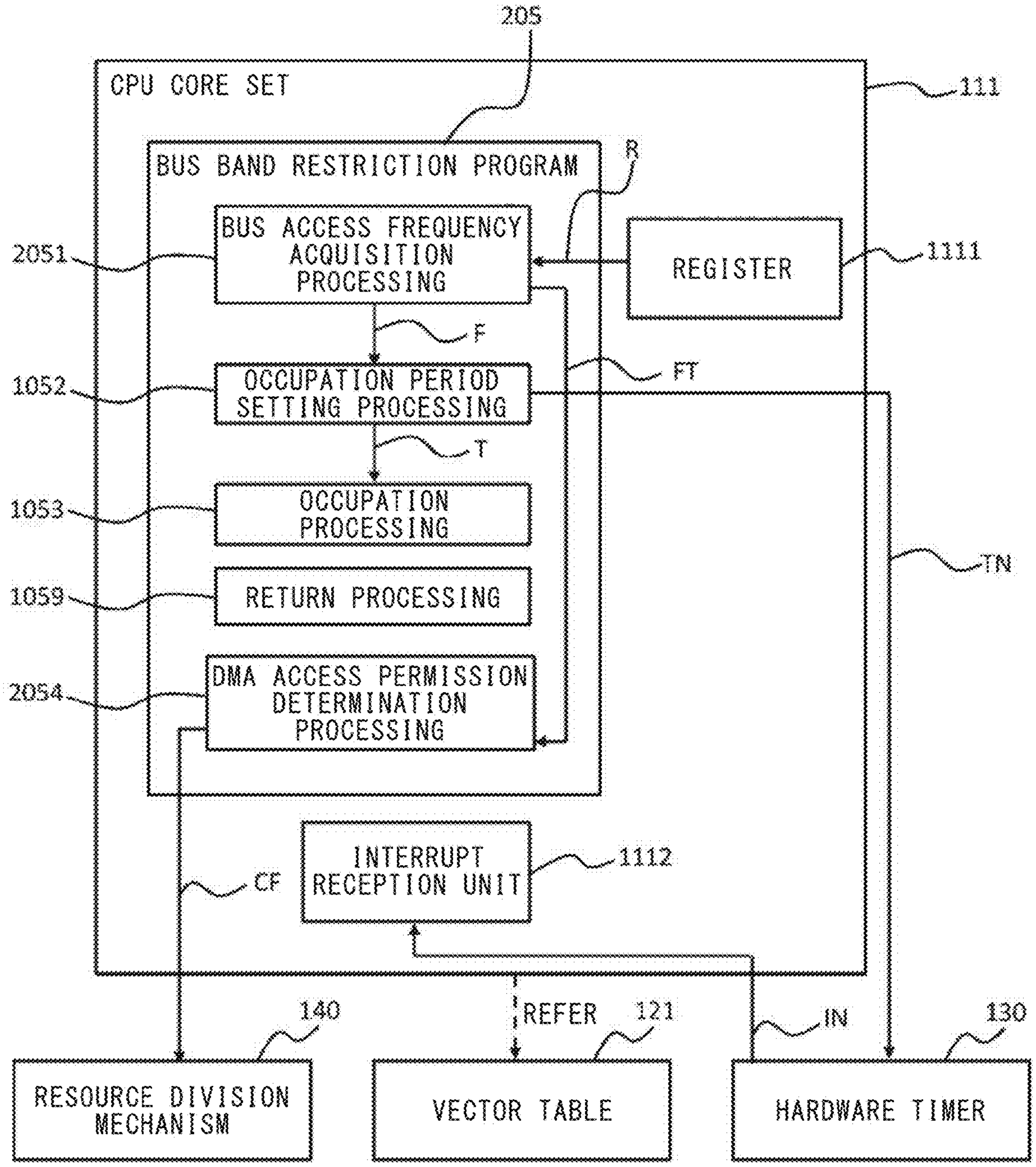
FIG. 5 is a block diagram showing a bus band restriction program according to embodiment 2.
Figure 6:
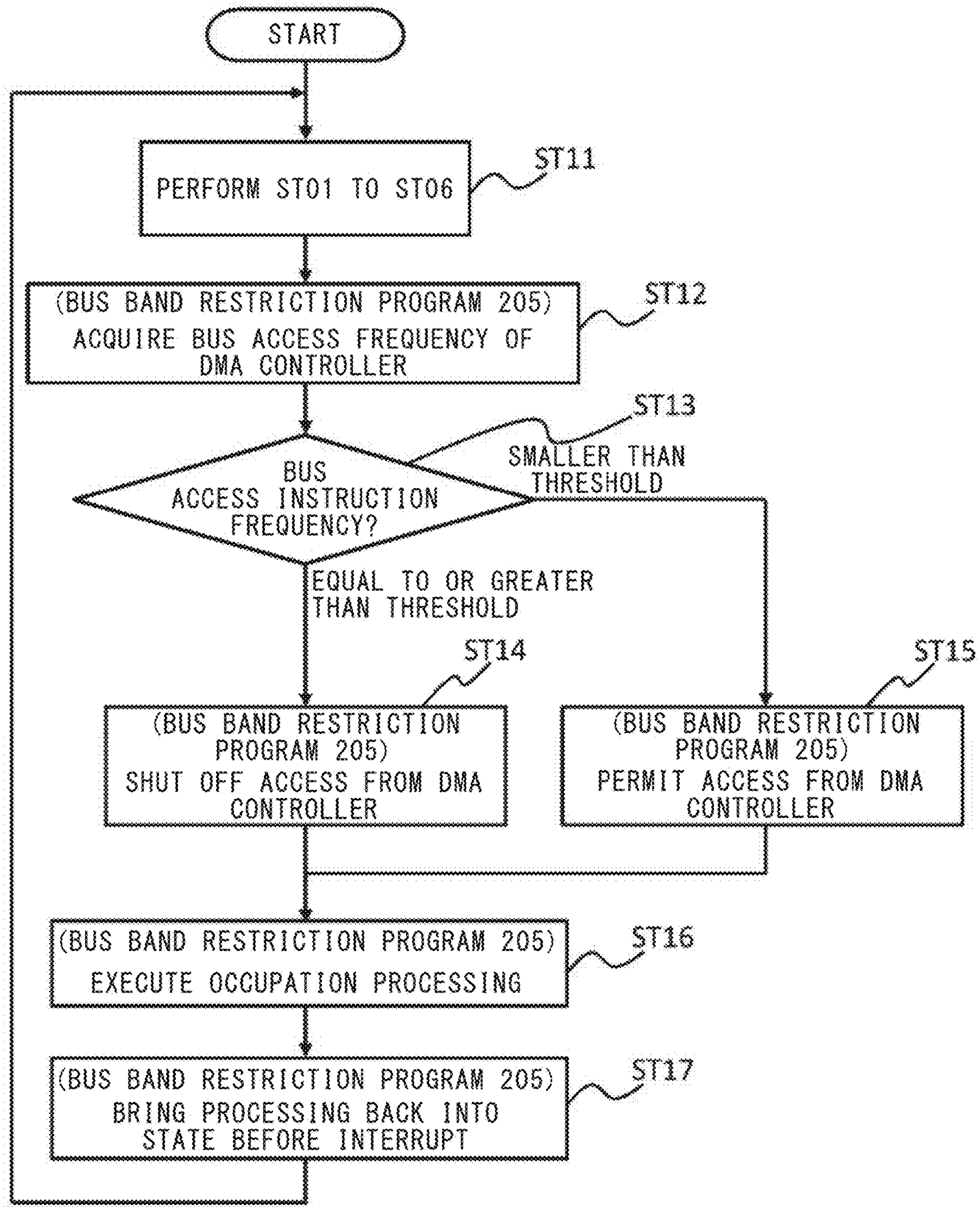
FIG. 6 is a flowchart showing operation of the bus band control device according to embodiment 2.

FIG. 5 is a block diagram showing the bus band restriction program according to embodiment 2. As with the bus band restriction program 105, the bus band restriction program 205 starts to operate with the interrupt notice IN from the hardware timer 130 as a trigger. The interrupt notice IN is received by the interrupt reception unit 1112 provided to the CPU core set 111. The CPU core set 111 having received the interrupt notice IN refers to the vector table 121, to execute processing by the bus band restriction program 205. Processing executed by the bus band restriction program 205 includes bus access frequency acquisition processing 2051 of acquiring the bus access frequency F and a bus access instruction frequency FT for access to control target buses, the occupation period setting processing 1052 of setting the occupation period T which is a period for executing the occupation processing on the basis of the bus access frequency F, the occupation processing 1053 of occupying a processing period in the CPU core set 111 during the occupation period T, the return processing 1059, and DMA access permission determination processing 2054 of permitting or prohibiting access to the shared memory 120 by the DMA controller 250 on the basis of the bus access instruction frequency FT.

The bus access frequency acquisition processing 2051 is processing of acquiring the bus access frequency F of access to the control target buses as in embodiment 1 and acquiring DMA transfer instructions to the DMA controller 250 by scanning a certain number of instructions around a program counter address just before an interrupt. In the bus access frequency acquisition processing 2051, the bus access instruction frequency FT for the control target buses via the DMA controller 250 is acquired from the contents of the acquired transfer instructions. In embodiment 2, the case of the DMA controller is described, but instructions to be acquired are instructions for access to buses through operation of another bus slave, such as DMA transfer instructions. By acquiring the bus access frequency F and the bus access instruction frequency FT, it is possible to grasp not only the frequency of bus access by the CPU core set 111 but also the frequency of bus access via another bus slave (in embodiment 2, the DMA controller 250), whereby usage statuses of bands of control target buses can be accurately grasped.

The occupation period setting processing 1052 and the occupation processing 1053 are the same as those in embodiment 1.

The DMA access permission determination processing 2054 is processing of determining whether or not to permit access to the shared memory 120 by the DMA controller 250, on the basis of whether or not the bus access instruction frequency FT is equal to or greater than a predetermined threshold. If the bus access instruction frequency FT is equal to or greater than the threshold, access to the shared memory 120 by the DMA controller 250 is shut off. More specifically, setting information CF for prohibiting access to the shared memory 120 by the DMA controller 250 is transmitted to the resource division mechanism 140, to update setting information of the resource division mechanism 140. The resource division mechanism 140 shuts off the dynamic control target external bus 285 in order to prohibit access to the shared memory 120 from programs other than a program having a predetermined key ID. If the bus access instruction frequency FT is smaller than the threshold, the setting information CF for permitting access to the shared memory 120 by the DMA controller 250 is transmitted to the resource division mechanism 140. The resource division mechanism 140 cancels shut-off in a case where the dynamic control target external bus 285 has been shut off.

Shut-off of the dynamic control target external bus 285 is for ensuring effectiveness of the occupation processing 1053 and is performed along with the occupation processing 1053.

Next, operation will be described. FIG. 6 is a flowchart showing operation, i.e., a bus band control method, of the bus band control device according to embodiment 2. First, the processing from step ST01 to step ST06 described in embodiment 1 (FIG. 3) is performed (step ST11). That is, operation from an interrupt by the hardware timer 130 to setting of the occupation period T is the same as that in embodiment 1.

Next, the bus access instruction frequency FT is acquired by the bus band restriction program 205 (step ST12).

Next, whether or not to permit access to the shared memory 120 by the DMA controller 250 is determined. As described above, whether or not to permit access to the shared memory 120 by the DMA controller 250 is determined on the basis of whether or not the bus access instruction frequency FT is equal to or greater than a predetermined threshold (step ST13). If the bus access instruction frequency FT is equal to or greater than the predetermined threshold, the setting information of the resource division mechanism 140 is updated and access to the shared memory 120 by the DMA controller 250 is shut off (step ST14). If the bus access instruction frequency FT is smaller than the predetermined threshold, access to the shared memory 120 by the DMA controller 250 is permitted (step ST15).

Next, the occupation processing is executed during the occupation period T by the bus band restriction program 205 (step ST16), and when the occupation processing is finished, return processing of bringing the processing of the CPU core set 111 back into a state before the interrupt is performed (step ST17). In addition, if access to the shared memory 120 by the DMA controller 250 has been shut off, the shut-off is cancelled.

According to embodiment 2, the same effects as in embodiment 1 can be obtained.

In addition, bus bands for other CPU core sets to use resources can be more reliably ensured. More specifically, the frequency of bus access instructions to the DMA controller for control target buses is grasped and whether or not to permit (permit or shut off) access by the DMA controller is determined on the basis of the frequency of bus access instructions. Thus, not only direct squeeze of bus bands by CPU core sets but also indirect squeeze of bus bands via a bus slave (DMA controller) is prevented. Thus, bus bands can be more reliably ensured.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

100, 200 bus band control device
101, 109 program
102 communication program
105, 205 bus band restriction program
111, 112 CPU core set
120 shared memory
121 vector table
122 storage area
130 hardware timer
140 resource division mechanism
181 control target system bus
182 non-control-target system bus
183 control target external bus
184 non-control-target external bus
190 non-control-target resource
250 DMA controller
285 dynamic control target external bus
1111 register
1112 interrupt reception unit
1051, 2051 bus access frequency acquisition processing
1052 occupation period setting processing
1053 occupation processing
1059 Return Processing
2054 DMA access permission determination processing
CF setting information
F bus access frequency
FT bus access instruction frequency
IN interrupt notice
R register content
T occupation period
TN interrupt time

The invention claimed is:

1. A bus band control device which, in a system in which a CPU core set which executes a plurality of programs, and a plurality of resources, are connected via a bus, controls a band of the bus used by the programs, the bus band control device comprising:

a resource division mechanism which is connected to the bus and determines ranges of the resources that are accessible by the respective programs;

a hardware timer which performs an interrupt to the CPU core set at a predetermined timing;

a shared memory which is one of the resources and has storage areas respectively allocated to the plurality of programs by the resource division mechanism; and a bus band restriction program which is executed by the CPU core set and which, when the interrupt is performed, causes execution of occupation processing for the CPU core set, and when the occupation processing is finished, brings processing of the CPU core set back into a state before the interrupt, wherein the storage areas include a vector table indicating processing to be executed when the interrupt is performed, and a storage area that the bus band restriction program uses, and the resource division mechanism permits only the bus band restriction program to access the hardware timer, the vector table, and the storage area that the bus band restriction program uses.

2. The bus band control device according to claim 1, wherein the bus band restriction program causes execution of bus access frequency acquisition processing of acquiring a content of a register of the CPU core set and acquiring a bus access frequency of access to the bus from the content of the register, and occupation period setting processing of setting an occupation period of the occupation processing on the basis of the bus access frequency.

3. The bus band control device according to claim 2, wherein in a case where there is a bus slave that accesses the resource in accordance with an instruction from the CPU core set, the bus band restriction program causes execution of processing of acquiring a frequency of a bus access instruction to the bus slave, processing of determining whether or not the frequency of the bus access instruction is equal to or greater than a predetermined threshold, and processing of causing the resource division mechanism to shut off access from the bus slave to the resource along with the occupation processing, in a case where the frequency of the bus access instruction is equal to or greater than the predetermined threshold.

4. The bus band control device according to claim 2, wherein the bus access frequency acquisition processing includes processing of acquiring the bus access frequency on the basis of a load instruction and a store instruction included in the content of the register.

5. The bus band control device according to claim 2, wherein the bus access frequency acquisition processing includes processing of acquiring the bus access frequency on the basis of a proportion of a load instruction and a store instruction among a certain number of instructions centered at a program counter address when the interrupt is performed.

6. The bus band control device according to claim 1, wherein the bus band restriction program causes adjustment of a frequency of the interrupt in a certain period.

7. The bus band control device according to claim 2, wherein the occupation period setting processing includes processing of setting the occupation period in proportion to the bus access frequency.

8. The bus band control device according to claim 2, wherein the occupation period setting processing includes processing of setting the occupation period in accordance with whether or not the bus access frequency is equal to or greater than a predetermined threshold.

9. The bus band control device according to claim 1, wherein in a case where there is another CPU core set in the system, the band of the bus is controlled for, as a control target, the program executed by the CPU core set, and a program executed by the other CPU core set is not a control target.

10. A bus band control method for, in a system in which a CPU core set which executes a plurality of programs, and a plurality of resources, are connected via a bus, controlling a band of the bus used by the programs, the bus band control method comprising the steps of:

performing an interrupt to the CPU core set by a hardware timer at a predetermined timing;

executing occupation processing for the CPU core set when the interrupt is performed; and bringing processing of the CPU core set back into a state before the interrupt when the occupation processing is finished, wherein storage areas of a shared memory which is one of the resources include a vector table indicating processing to be executed when the interrupt is performed, and a storage area that a bus band restriction program for executing the occupation processing uses, and only the bus band restriction program is permitted to access the hardware timer, the vector table, and the storage area that the bus band restriction program uses.

11. The bus band control method according to claim 10, further comprising the steps of:

acquiring a content of a register of the CPU core set when the interrupt is performed, and acquiring a bus access frequency of access to the bus from the content of the register; and setting an occupation period of the occupation processing on the basis of the bus access frequency.

12. The bus band control method according to claim 11, further comprising the steps of:

in a case where there is a bus slave that accesses the resource in accordance with an instruction from the CPU core set, acquiring a frequency of a bus access instruction to the bus slave when the interrupt is performed;

determining whether or not the frequency of the bus access instruction is equal to or greater than a predetermined threshold; and shutting off access from the bus slave to the resource along with the occupation processing, in a case where the frequency of the bus access instruction is equal to or greater than the predetermined threshold.

13. The bus band control method according to claim 11, wherein in the step of acquiring the bus access frequency, the bus access frequency is acquired on the basis of a load instruction and a store instruction included in the content of the register.

14. The bus band control method according to claim 11, wherein in the step of acquiring the bus access frequency, the bus access frequency is acquired on the basis of a proportion of a load instruction and a store instruction among a certain number of instructions centered at a program counter address when the interrupt is performed.

15. The bus band control method according to claim 10, further comprising the step of adjusting a frequency of the interrupt in a certain period.

16. The bus band control method according to claim 11, wherein in the step of setting the occupation period, the occupation period is set in proportion to the bus access frequency.

17. The bus band control method according to claim 11, wherein in the step of setting the occupation period, the occupation period is set in accordance with whether or not the bus access frequency is equal to or greater than a predetermined threshold.

18. The bus band control method according to claim 10, wherein in a case where there is another CPU core set in the system, the band of the bus is controlled for, as a control target, only the program executed by the CPU core set, and a program executed by the other CPU core set is not a control target.

* * * * *